United States Patent
Draisey (10) Patent No.: US 9,513,179 B2
(45) Date of Patent: Dec. 6, 2016

(54) FORCE MOMENT SENSOR

(71) Applicant: GOOD VIBRATIONS ENGINEERING LTD., King (CA)

(72) Inventor: Sherry Lynn Draisey, King (CA)

(73) Assignee: GOOD VIBRATIONS ENGINEERING LTD., King, ON (CA)

( * ) Notice: Subject to any disclaimer, the term of this patent is extended or adjusted under 35 U.S.C. 154(b) by 0 days.

(21) Appl. No.: 14/601,012

(22) Filed: Jan. 20, 2015

(65) Prior Publication Data

US 2015/0204742 A1    Jul. 23, 2015

Related U.S. Application Data

(60) Provisional application No. 61/929,299, filed on Jan. 20, 2014.

(51) Int. Cl.
*G01L 5/16* (2006.01)
*B25J 13/08* (2006.01)
(Continued)

(52) U.S. Cl.
CPC .............. *G01L 5/16* (2013.01); *B25J 13/085* (2013.01); *G01L 1/005* (2013.01); *G01L 3/1478* (2013.01)

(58) Field of Classification Search
CPC .................................... G01M 1/16; G01L 5/16
(Continued)

(56) References Cited

U.S. PATENT DOCUMENTS 5,033,314 A    7/1991   Draisey
5,041,754 A *  8/1991   Smythe ................. H03H 9/566
                                              310/317
(Continued)

FOREIGN PATENT DOCUMENTS

CA    2090544    8/1993
DE    3240521    5/1984
(Continued)

OTHER PUBLICATIONS

Development of Low Frequency Force Moment Sensory Using Piezoceramic Elements. Montreal Canada, Cansmart Conference, 2003.
(Continued)

*Primary Examiner* — Lisa Caputo
*Assistant Examiner* — Octavia Hollington
(74) *Attorney, Agent, or Firm* — Hill & Schumacher (57) ABSTRACT

A force moment sensor for sensing forces and moments in a system through which forces and moments are transferred from an input member to an output member is disclosed. It includes a housing, an inner tube, a load plate, a plurality of elongate connectors and a plurality of dynamic deflection measuring devices. The housing has a base portion and an outer tube portion generally orthogonal to the base portion. The inner tube, a poled piezoceramic element, is operably connected to the base portion and spaced inwardly of the outer tube. The load plate is attached to the inner tube, spaced from the base portion and spaced from the outer tube. The plurality of elongate connectors are connected between the load plate and the outer tube portion. The plurality of dynamic deflection measuring devices are attached to the load plate for measuring dynamic flexible deflections of the load plate.

12 Claims, 9 Drawing Sheets

(51) Int. Cl.
*G01L 1/00* (2006.01)
*G01L 3/14* (2006.01)

(58) Field of Classification Search
USPC .................................................. 73/862.041
See application file for complete search history.

(56) References Cited

U.S. PATENT DOCUMENTS

| | | | |
|---|---|---|---|
| 7,424,827 B2 * | 9/2008 | Yamada | G01N 29/045 73/579 |
| 2004/0045372 A1 | 3/2004 | Liu et al. | |

FOREIGN PATENT DOCUMENTS

| | | |
|---|---|---|
| DE | 10217019 | 7/2003 |
| DE | 10217018 | 11/2004 |
| DE | 19216918 | 7/2007 |
| DE | 102007037262 | 12/2008 |
| DE | 102007026827 | 1/2009 |
| KR | 20040098324 | 11/2004 |
| KR | 20070084807 | 8/2007 |
| KR | 20120121958 | 11/2012 |
| KR | 20130048321 | 5/2013 |
| KR | 20130049918 | 5/2013 |
| WO | 201088922 | 8/2010 |
| WO | 2014110682 | 7/2014 |

OTHER PUBLICATIONS

Space Robotic Force Moment Sensing: Boundary Condition Issues. Montreal Canada Workshop 2005 www.gve.on.ca/cctomm.pdf.

* cited by examiner

FORCE MOMENT SENSOR

FIELD OF THE DISCLOSURE

This disclosure relates to force moment sensors and in particular force moment sensors for use in robotic systems.

BACKGROUND

A force moment sensor allows for the sensing of six degrees of freedom force measurement. Dexterous tasks in close proximate operations where camera views are insufficient need these senses of touch to avoid overloading both the payloads they are handling and themselves. A force moment sensor is an instrument that typically is integrated into a robotic arm. It is particularly useful in space applications as well as underwater applications.

Space robotic operations take place over extended time frames (hours to days), under fluctuating temperature environments, on a flexible robotic arm. The need to capture 'free flying' bodies (ie spacecraft which are 'freely floating' with respect to the capturing robot) is a further challenge over those of terrestrial environments.

Lack of atmosphere drives temperatures to be either hot in sun or cold in shade. Since robots are typically used for moving things around, so they go into and out of shade repeatedly.

There are a number of challenges when determining the force and moment applied to a robotic arm in an unknown environment. These challenges are even more difficult in a space environment. Typically force is not directly measurable. It can be inferred from strain or deflection. However, such measures are affected by thermal distortion. It is well known that long robot arms and the need to capture 'free flyers' generate large rotational forces. In addition, a high stiffness requirement makes measurement of strain or deflection more difficult to isolate from thermal distortion. Further, drift in space operations tend to be slow—often taken over a period of hours. Still further, it is important to distinguish all 6 degrees of force measurement, but the shear and moment loading cases can produce difficult to distinguish effects Accordingly a force moment sensor designed for use in space or underwater would be desirable.

SUMMARY

The present disclosure relates to a force moment sensor for sensing forces and moments that are transferred from an input member to an output member. The force moment sensor includes a housing, an inner tube, a load plate, a plurality of elongate connectors and a plurality of dynamic deflection measuring devices. The housing has a base portion and an outer tube portion extending from the base portion. One of the input member and the output member is attachable to the base portion. The inner tube is operably connected to the base portion of the housing and spaced inwardly of the outer tube. The inner tube being is a poled piezoceramic element. The load plate is attached to the inner tube, spaced from the base portion of the housing and spaced from the outer tube. The load plate has a circumference and a centre axis. The other of the input member and the output member is attachable to the load plate. The plurality of elongate connectors are connected between the load plate and the outer tube portion around the circumference of the load plate. Each elongate connector defines a longitudinal axis and the longitudinal axes of the plurality of the elongate connectors intersect the centre axis of the load plate when in an undeflected configuration. The plurality of dynamic deflection measuring devices are attached to the load plate for measuring dynamic flexible deflections of the load plate.

The outer tube may extend generally orthogonally to the base portion.

The inner tube may include a plurality of segments and each segment is independently responsive to current. There may be at least four segments. Each segment may be poled in an axis parallel to the centre axis. Alternatively, each segment may be poled in an axis angled to the centre axis. As a further alternative at least one segment is poled in an axis parallel to the center axis and at least another segment is poled in an axis angled to the centre axis.

A plurality of thermal straps may be attached between the load plate and the housing. Each of the plurality of thermal straps may be positioned proximate to each of the plurality of elongate connectors.

Each elongate connector may be a pin ended strut. Alternatively, each elongate connector may be a cable.

Each dynamic measuring device may be an accelerometer.

The present disclosure also relates to a computer implemented method of determining a force and moment of an external load applied to a force moment sensor having an inner tube and a load plate, the method comprising the steps of:

applying a current to the inner tube through a definable range of frequencies;

extracting the resonant frequency and associated dynamic shape of the load plate over the range of frequencies;

comparing the extracted resonant frequency and associated dynamic shape to the calibration curve; and     determining the external load.

The extracting step may include measuring acceleration of a plurality of locations on the loading plate and calculating the frequency and the dynamic shape of the load plate.

The calculating step may be done using fast fourier transform.

The present disclosure also relates to a system for sensing forces and moments including an input member; an output member; a force moment sensor and a processing means. The force moment sensor has a housing, an inner tube including a poled piezoceramic element, a load plate attached to the inner tube and spaced from the housing and a plurality of elongate connectors connected between the load plate and the housing and a plurality of dynamic deflection measuring devices. The housing is connected to one of the input member and the output member and the load plate is connected to the other of the input member and the output member. The processing means is for determining the external load applied to the force moment sensor.

Further features will be described or will become apparent in the course of the following detailed description.

BRIEF DESCRIPTION OF THE DRAWINGS

The embodiments will now be described by way of example only, with reference to the accompanying drawings, in which.

DETAILED DESCRIPTION

Figure 1:
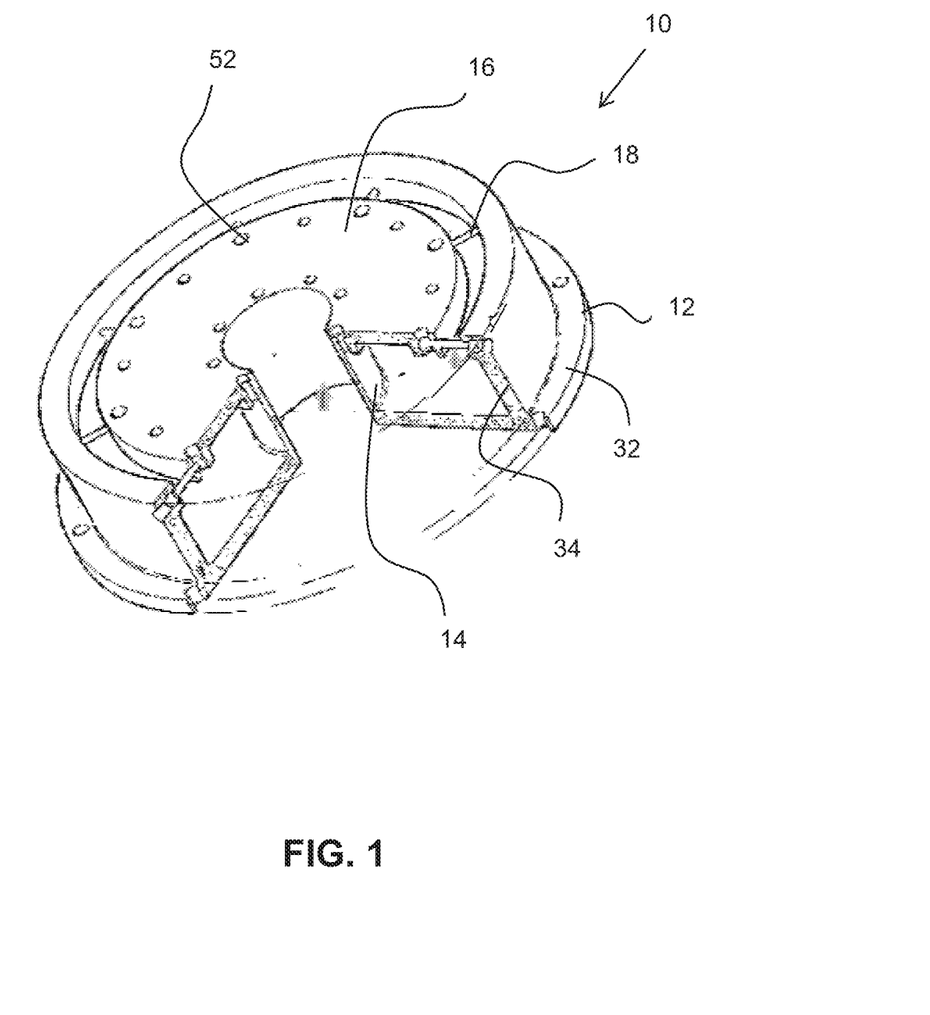
FIG. 1 is a perspective view of an embodiment of a force moment sensor and showing a portion broken away.
Figure 8:
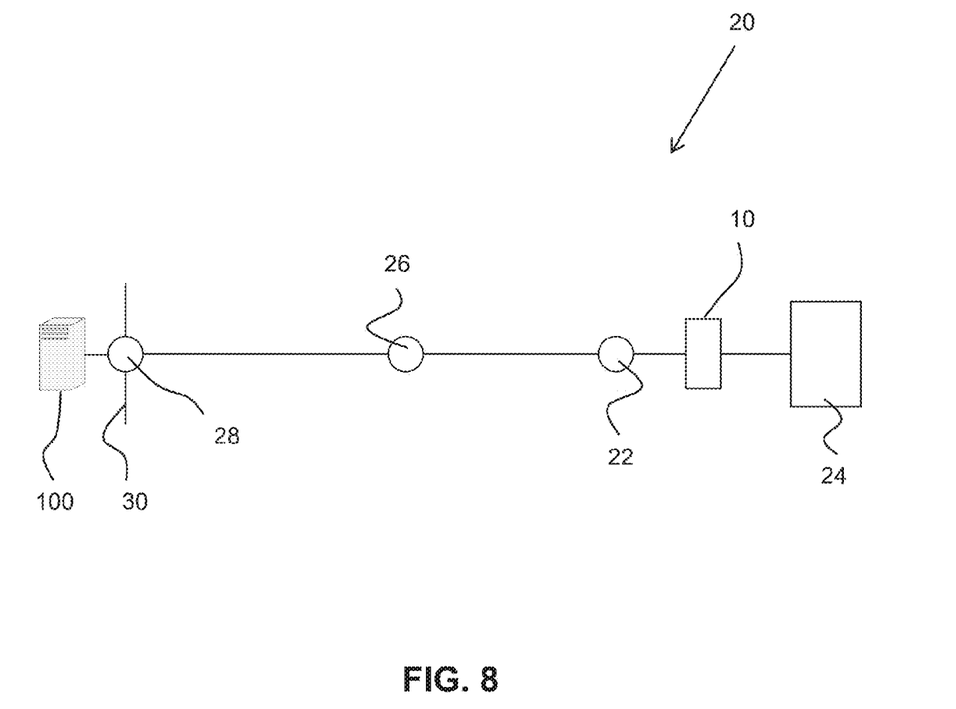
FIG. 8 is a schematic view of a force moment sensor in a robotic arm.

Referring to FIG. 1 a force moment sensor is shown generally at 10. The force moment sensor 10 includes a housing 12, an inner tube 14, a load plate 16 and a plurality of elongate connectors 18. The force moment sensor 10 is for use in a robotic arm 20 as shown in FIG. 8. In one embodiment, the force moment sensor 10 is positioned between a wrist joint 22 and an end effector 24. Typically the arm 20 will also include an elbow joint 26 and a shoulder joint 28. If the arm is for use in space the shoulder joint 28 will be attached to the space craft 30. In another embodiment the force moment sensor is positioned at the root of the arm. It will be appreciated by those skilled in the art that the force moment sensor may be positioned at any location along the arm. By way of example, the force moment sensor 10 is for sensing forces and moments in a system or arm 20 through which forces and moments are transferred from an input member, the wrist 22 to an output member, end effector 24.

The housing has a base portion 32 and outer tube portion 34 generally orthogonal to the base portion 32. The base portion 32 is attached to one of the input member and the output member. The load plate 16 is attached to the other of the input member and the output member.

Figure 2:
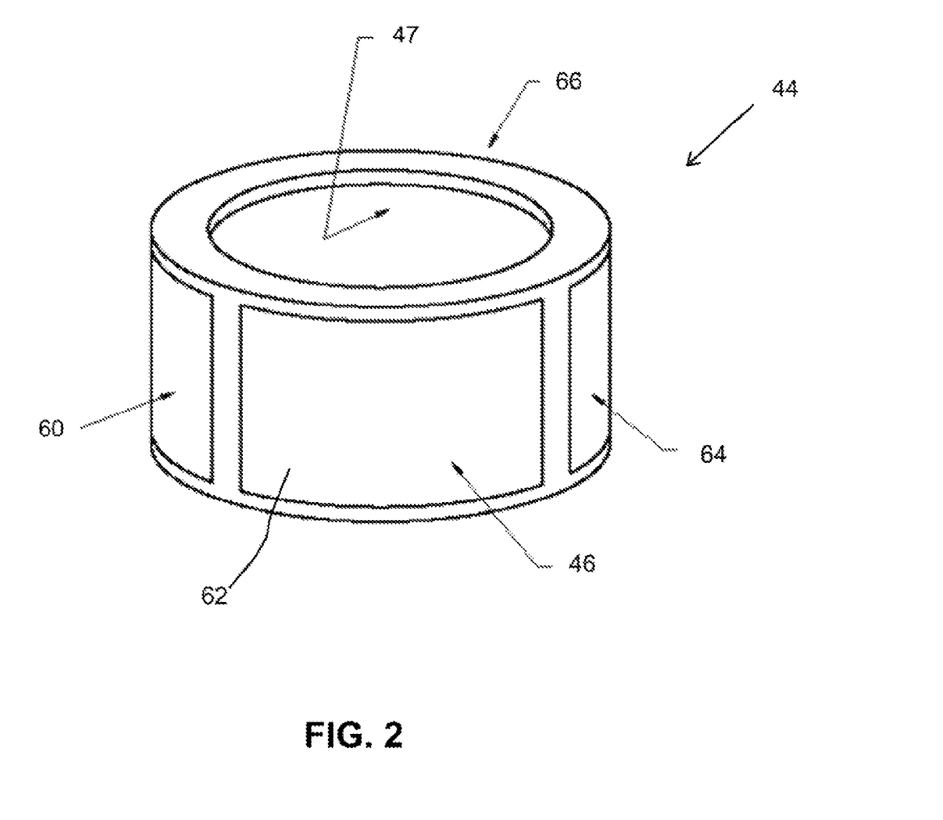
FIG. 2 is a perspective view of the inner tube of the force moment sensor of FIG. 1.
Figure 3:
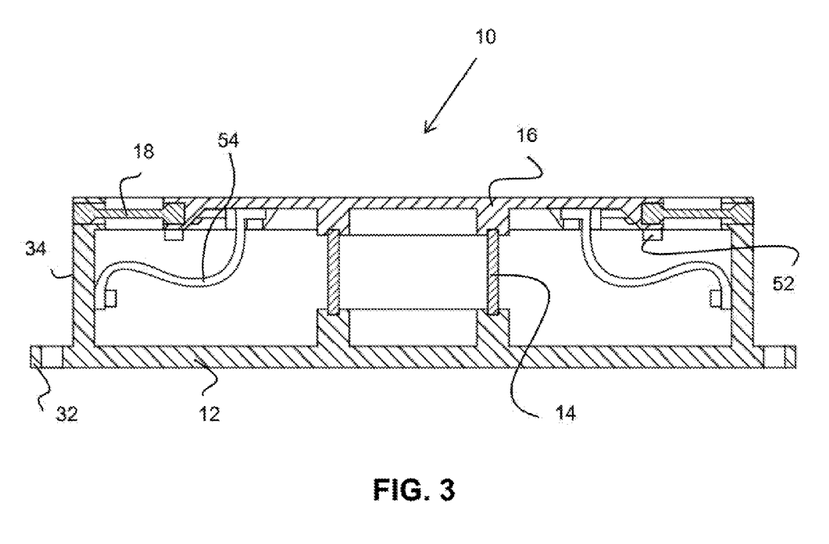
FIG. 3 is a cross sectional view of the force moment sensor of FIG. 1.
Figure 4:
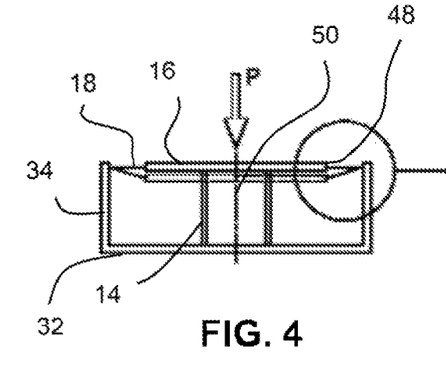
FIG. 4 is a cross sectional schematic view of force moment sensor of FIG. 1, shown under an axial load.
Figure 5:
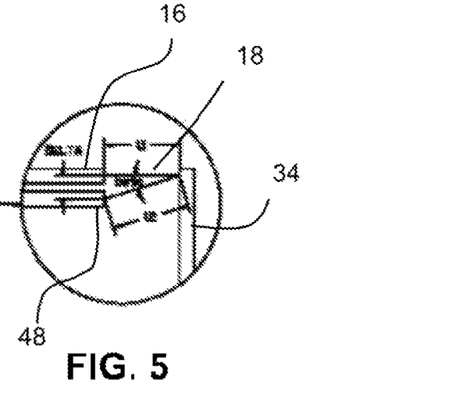
FIG. 5 is a close up view of the deflected boundary condition between load plate and the housing of FIG. 4.
Figure 6:
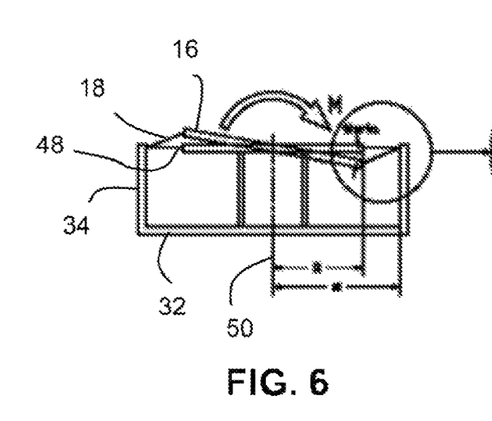
FIG. 6 is a cross sectional schematic view of the force moment sensor of FIG. 1, shown under a moment load.
Figure 7:
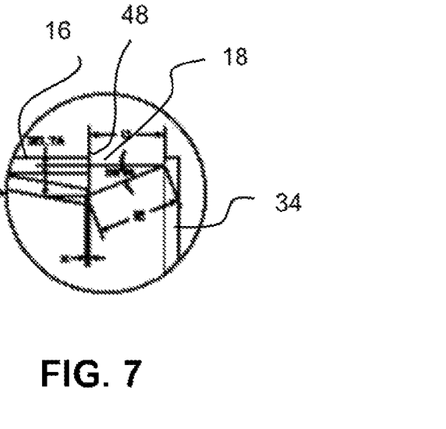
FIG. 7 is a close up view of the deflected boundary condition between load plate and the housing of FIG. 6.

The inner tube 14 is operably connected to the base portion 32 of the housing 12. The inner tube 14 is spaced inwardly of the outer tube 34. The inner tube 14 is a poled piezoceramic hollow tube element. The inner tube 14 may be a hollow inner tube as shown in FIG. 1 or alternatively the inner tube 44 may include a top 47 as shown in FIG. 2. Preferably the inner tube 44 includes a plurality of poled segments 46. In the embodiment shown herein the top 47 of the inner tube 44 has thin metal coating and is referred to as a segmented zero or ground. Preferably there are at least four segments as shown in FIG. 2. Each segment is independently responsive to current.

The load plate 16 is attached to the inner tube 14. It is spaced from the base portion 32 of the housing 12 and spaced from the outer tube 34 of the housing 12. The load plate 16 has a circumference 48 and a centre axis 50 (shown on FIGS. 4 and 6). The plurality of dynamic deflection measuring devices 52 are attached to the load plate 16 and are for measuring dynamic flexible deflections of the load plate 16. Preferably the dynamic deflection measuring devices 52 are accelerometers. The load plate 16 may have a hole in the centre 53 as shown in FIG. 1 or it may be solid through the centre as shown in FIGS. 3 to 7.

The plurality of elongate connectors connected 18 are attached between the load plate 16 and the outer tube portion 34 of the housing 12 around the circumference 48 of the load plate 16. Each elongate connector defines a longitudinal axis and the longitudinal axes of the plurality of the elongate connectors intersect the centre axis 50 of the load plate 16 when in an undeflected configuration. Each connector may be a pin ended strut. Alternatively each elongate connector may be a cable.

Each segment 46 may be poled in an axis parallel to the centre axis 50. Alternatively each segment 46 may be poled in an axis angled to the centre axis. As a further alternative segmented inner tube 44 may include segments that have parallel poles and angled poles.

The force moment sensor 10 may also include a plurality of thermal straps 54 attached between the load plate 16 and the housing 12. Preferably the thermal straps are positioned proximate to each of the plurality of elongate connectors 18.

Drift is often a problem when sensing the force and moment in a robotic system. Drift may be as much as 10% of measurements, over an 8 hour period. To reduce drift, the sensing mode that is used is the frequency domain. This is done principally by use of fast fourier transform technology of data acquired from motion sensors (accelerometers, displacement transducers, etc). But for cases of impact force, which must be acted on quickly, an analogue frequency tracking device may also be used to determine impact by monitoring frequency change of lowest resonance. These are well known and as such do not form part of this disclosure. To track frequency shift under general loading conditions, the shapes of a plurality of modes are employed as identification.

To identify frequency shift as a result of robotic forces, the force moment sensor 10 described above may be used. It is a non-linear system that allows for extraction of applied load in all six degrees of freedom, based on frequency shift, augmented by dynamic shape identification.

In order to implement the non-linear approach, a means of dynamically exciting the structure, well separated in frequency from the robotic system dynamic frequency, has been developed. A segmentially poled ceramic element is used to drive its segments to ensure excitation of eigenvalues of the structure. By careful selection of the poling arrangement, driving frequency spectra and poling sequence, including utilization of Poisson's ratio effect, it is possible to excite mode shapes which are sufficient to extract all six degree of freedom forces, using a cyclic swirling excitation. FIG. 2 shows the poling segments 46. Swirling is done by serially exciting a first segment 60, followed by second segment 62, a third segment 64 and then a fourth segment 66; continuously repeating the process at a frequency to excite a torsion mode.

The modes are determined which are excited by the non-linearities created by each of the six degrees of applied forces. Not all modes of the force moment sensor 10 are sensitive to non-linearities.

FIG. 1 shows the positioning of the inner tube 14 or ceramic element actuator within the housing 12. As well as performing as a vibration actuator for the dynamic transduction sensor, the inner tube 14 or ceramic element forms a parallel load path to the outer housing. The inner tube 14 transmits a portion of loads between the loading plate 16 (nominally attached to an end effector 24) and the base portion 32 of the housing 12 (nominally attached to wrist joint 22 of robotic arm 20). The axis system corresponds to a right hand system, with Z direction aligned with P (axial load) direction of FIG. 4.

There are several means of generating the structural non-linearity. They are all dependent on the elongate connectors 18, shown in FIG. 1. The purpose of the elongate connectors 18 is to reduce shear loads being transferred through to the outer tube portion 34 of the housing 12, under low loading conditions. The effect is to reduce the torsion and moment stiffness of the unloaded force moment sensor 10.

Figure 13:
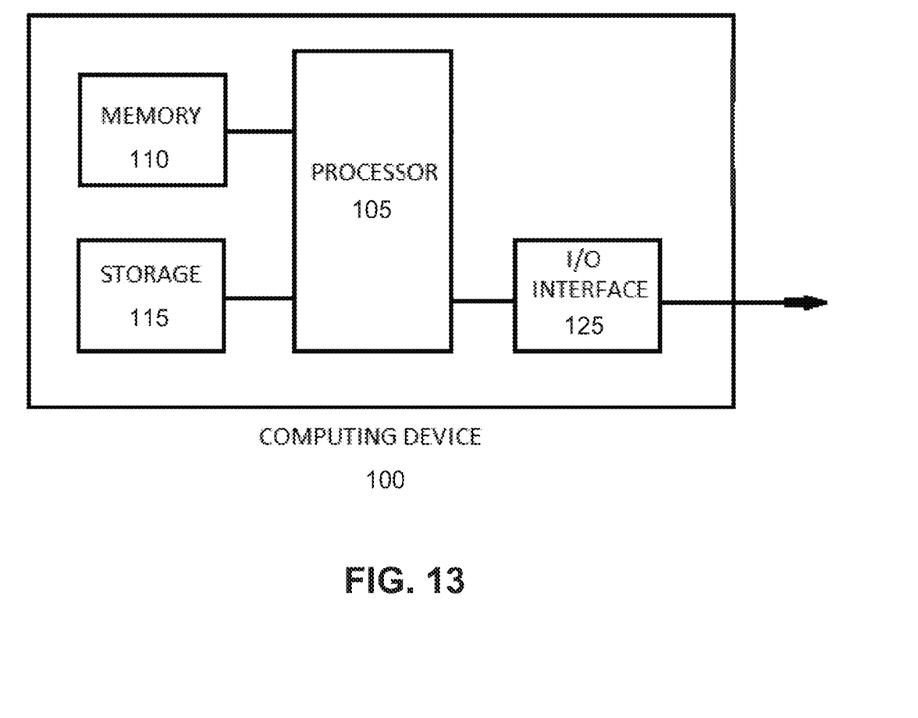
FIG. 13 shows an example computing device for use in association with the methods and systems of the force moment sensor of FIG. 1.

The configuration of the pin ended strut elongate connectors 18 is enabled by the use of bearing surface, at the end points of each pin ended strut. In conventional force sensor configurations, discontinuities such as bearings are avoided—because of they create a hysteretic condition. While that is also true in this sensor design, the impact is not as important—because the hysteresis occurs in the high load region, but has less influence in the low loading regions. FIG. 13 shows an example computing device 100 used in association with the force moment sensor 10. The computing device 100 comprises a processor 105. The processor 105 can be one or a plurality of processors working together. The computing device 100 further comprises a memory component 110. The memory component can be one or a combination of known active memory units such as random access memory (RAM), read only memory (ROM) or other known units. The computing device 100 further comprises a storage component 115. The storage component can be one or more selected from the group comprising, but not limited to: a hard disk drive, a solid-state drive, a CD-ROM or DVD drive or a high-capacity low-volatile memory. The computing device 100 further comprises an I/O interface 125. The I/O interface 125 represents all wired and wireless connections to various secondary computing devices which can be one or more selected from the group comprising, but not limited to: monitor, mouse, mobile device, touchscreen, keyboard, speaker system, kinetic feedback device and microphone. These devices may be connected via a VGA, USB, DVI, FireWire port or other known input/output ports.

The methods and systems of the present disclosure may be implemented by instructions stored in the storage 115 of the computing device 100 or the server's storage which is loaded into the active memory 110 of the user which will further instruct the process to utilize I/O interfaces 125 to either transmit information to the network, request further content from the user or to provide information to the user. The computing device 100 may already include software and/or hardware for providing the proper functionality to perform the network interactions described herein. A computing device may therefore include one or more of the following: logic arrays, memories, analog circuits, digital circuits, software, firmware, and processors such as microprocessors, field programmable gate arrays (FP-Gas), application specific integrated circuits (ASICs), programmable logic devices (PLDs) and programmable logic arrays (PLAs). The processes, methods and systems described herein may be embodied in part or in full to operate on a computing device described herein. They may be implemented in the form of firmware, an application program, an applet, a browser plug-in, a COM object, a dynamic linked library, a script, one or more subroutines, or an operating system component or service.

Four of the six degrees of freedom loading produce generally independent degrees of freedom—ie each of two moment degrees of freedom has five modes which only shift in frequency significantly under the moment loading condition. The remaining 2 degrees of freedom shapes are interdependent on two overdetermined degrees of freedom. Thus the matrices are well conditioned.

Figure 9:
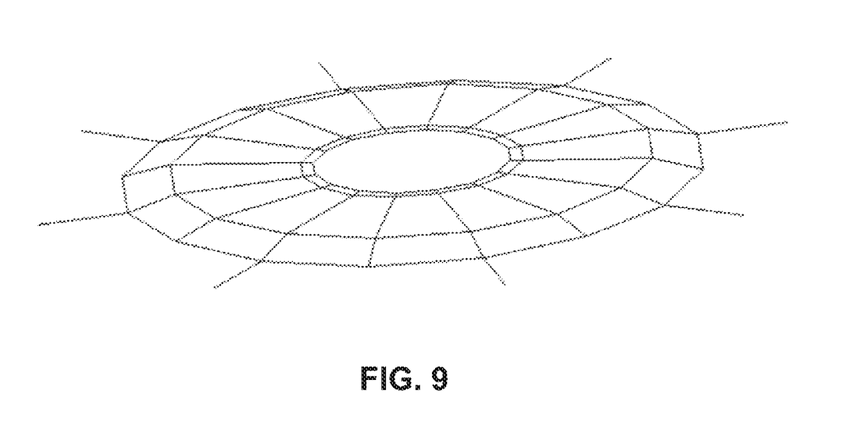
FIG. 9 is a schematic view of an undeflected mode shape of an unloaded load plate of the force moment sensor of FIG. 1.
Figure 10:
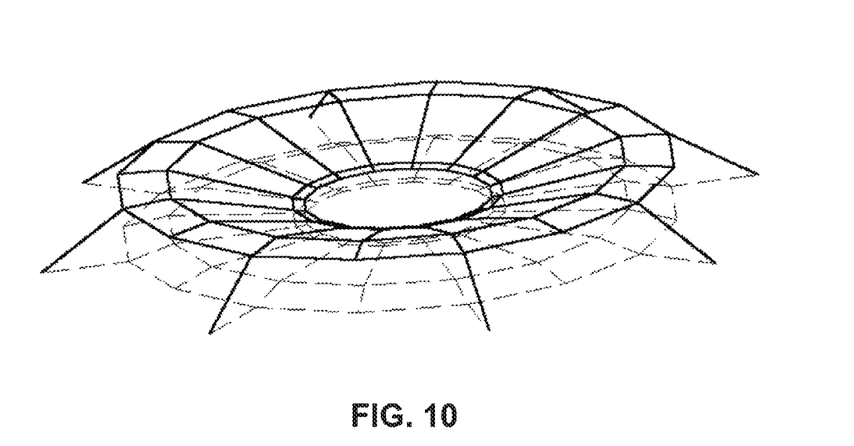
FIG. 10 is a schematic view of an example of a modal signature defined by a mode shape for a mode whose frequency is used in determining applied axial load on the load plate of the force moment sensor of FIG. 1.
Figure 11:
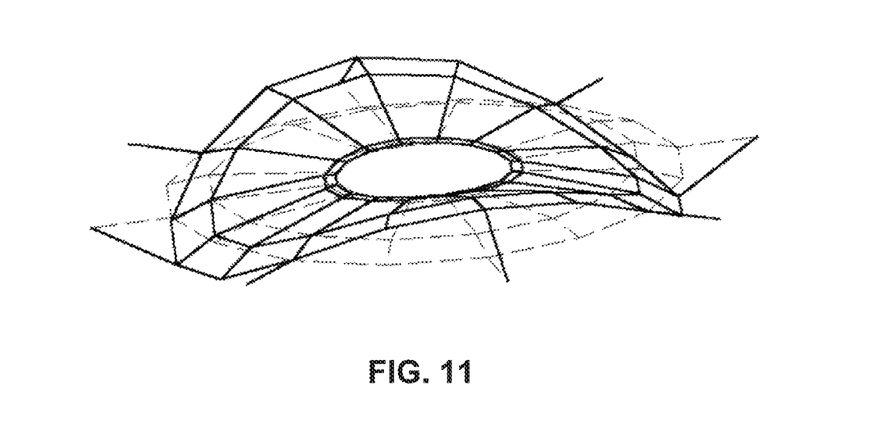
FIG. 11 is a schematic view of an example of a modal signature defined by a mode shape for a mode whose frequency is used in determining applied moment load on the load plate of the force moment sensor of FIG. 1.
Figure 12:
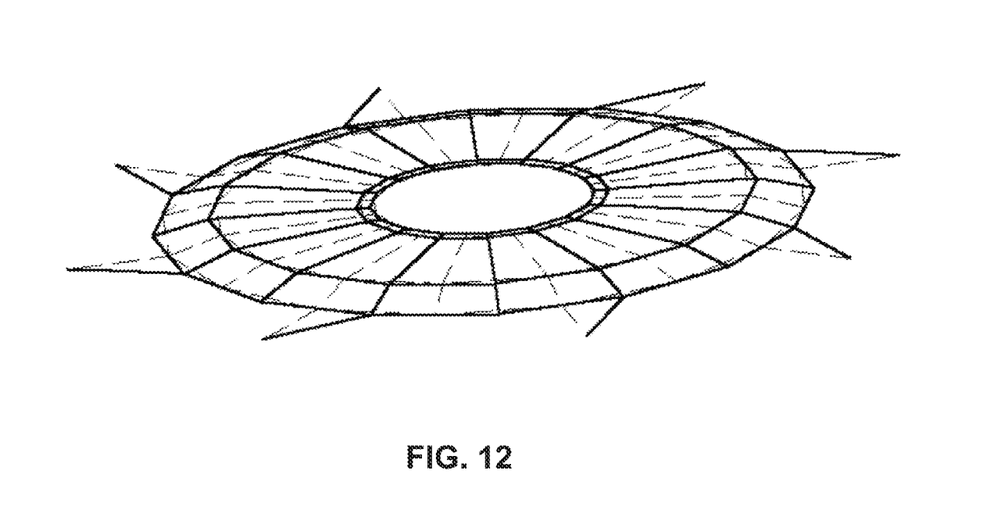
FIG. 12 is a schematic view of an example of a modal signature defined by a mode shape for a mode whose frequency is used in determining applied torsion load on the force moment sensor of FIG. 1.

Modes are determined which are excited by the non-linearities created by each of the six degrees of freedom of applied forces. Not all modes of the structure are sensitive to non-linearities. FIG. 9 shows the undeflected shape and FIGS. 10 to 12 show the deflected shapes of the load plate 16 of force moment sensor 10 for some example signatures or mode shapes. FIG. 10 shows a signature or mode shape that is suitable for measuring externally applied axial load. FIG. 11 shows a signature or mode shape that is suitable for measuring an externally applied moment load. FIG. 12 shows a signature or mode shape that is used to measure an externally applied torsion Load. However, there are several modes that measure a combination of externally applied loads, by way of example, the shear modes would fit into this category. However, it should be noted that the user may define specific modes that are useful for specific applications.

By way of example a plurality of 3 degree of freedom accelerometers are used for dynamic deflection measuring devices 52 and are sufficient to define shape information to track individual modes as their frequencies shift. They are positioned to extract dynamic deflection shapes—corresponding to mode shape (eigenvector) information around the perimeter of the loading plate, for the measured frequencies (eigenvalues) as they shift. This means that the sensing elements are not directly in the load path. It offers the advantage that accelerometers can be used as sensing device. The driven dynamic mode shape information being extracted is superimposed onto the quasi-static deflection shapes of the loaded force moment sensor 10, though this superposition information is not part of the load transduction algorithm (the accelerometers do not measure it, since it is quasi static, well enough separated in frequency to be considered steady state). It will be appreciated by those skilled in the art that the number of measuring devices 52 used will be determined by the user. While using more provide better accuracy it also increases the weight and wires. Therefore when deciding on the number of measuring device 52 used a balance will be struck between accuracy and weight. By way of example only, there may be eight 1 degree of freedom accelerometers in the out of plane direction and two 3 degrees of freedom accelerometers in each of the other directions. The issue of determining externally applied load is based on measurement of frequency shift (increase from unloaded state) for groups of dynamic shapes which change their stiffness, as a result of internal boundary conditions which are modified by the deflected motion produced by the externally applied loads.

The shapes can be considered as a form of modal signature, acting as a unique identifier, even when the frequencies themselves change. The modal signature is used as a means of identifying dynamic modes. Each modal signature will be very similar regardless of the magnitude of the externally applied load. FIG. 10 is an example of a modal signature for a mode whose frequency is used in determining applied axial load. FIG. 11 is an example of a modal signature for a mode whose frequency is used in determining applied moment load. FIG. 12 is an example of a modal signature for a mode whose frequency is used in determining applied torsion load.

Though the frequency of the mode shapes will change substantially under externally applied loads, the shapes remain identifiable.

In use a process of determining applied load includes the steps of:

Measure resonant frequencies;

Note associated dynamic shapes for multiple modes (in the range of 20 modes), extracted from accelerometer measurements;

Correlate dynamic shapes (modal signatures) with stored undeflected dynamic shapes (obtained from calibration testing); and Check lookup table on the basis of dynamic shape (its modal signature), to determine the amplitude of externally applied load, associated with the dynamic shape (or signature).

The degree of non-linearity of the system is enhanced by its application in the frequency domain. The Q factor (dynamic amplification factor) increases the non-linearity over that experienced as a static force application.

There are three non-linear mechanisms being exploited. The first is the geometric non-linearity, shown in FIGS. 4 and 6. The motion is shown for an axial load, P in FIG. 4 and a moment load, M, in FIG. 6.

The second non-linearity is the change of internal boundary conditions between the loading plate 16 and outer tube 34 of the housing 12. After the loads have increased enough, and the elongate connectors 18 have achieved sufficient rigid body deflection, they allow for enough shear transfer between the loading plate 18 and outer tube 34 to create a propped condition between the loading plate 18 and outer tube 34. The combination of the deflected shape and the driven dynamic shape acts to increase the rate of frequency change, under the higher applied loading conditions.

The third non-linearity is the tension and buckling effect of the elongate connectors 18 (see FIG. 1). The tensioning effect is used to increase frequency for the higher applied loading cases. The buckling effect is used to improve applied shear load resolution for the applied loading conditions. The elongate connector 18 moment of inertia should be small enough to enable compression buckling.

The continuously changing thermal environment of a robot moving in and out of shade tends to interact with means of deriving force information from strain or motion measurements. The minimum measurable force and its sense (+/−) of the system is very important for any autonomous or telerobotic operations. The testing to date, with no thermal compensation processing, has shown that for a system temperature change of 10° C., there were no changes to the frequencies being tracked. The application of 2° C. gradient across the sensor diameter generated an error of 2.2 Newtons for an applied axial load of 50 Newtons, based on the use of only one mode being tracked for prediction. To reduce the thermal gradient between the loading plate 16 and housing 12, thermal straps 54, carrying as little structural load as possible may be positioned parallel to each of the elongate connectors 18.

Figure 14:
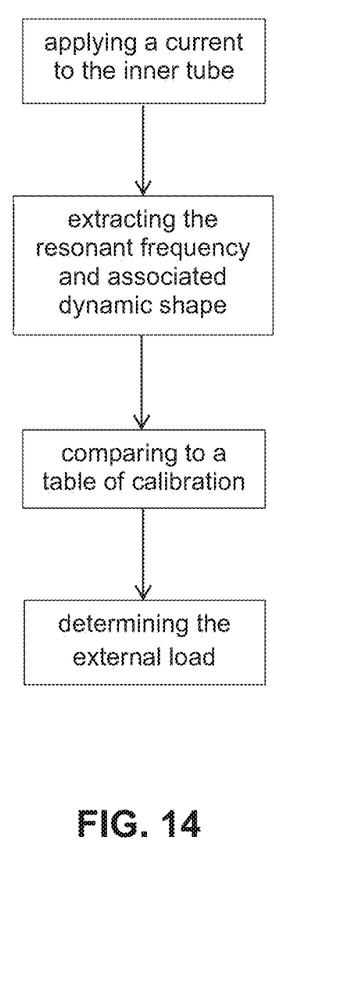
FIG. 14 is a flow chart of an example process for determining loads.

FIG. 14 shows a flow chart of an example process for determining loads on the force moment sensor 10. In use there is a method for determining a force and moment of an external load applied to a force moment sensor 10 comprising the steps of:

applying a current to the inner tube 14 through a definable range of frequencies;

extracting the resonant frequency and associated dynamic shape of the load plate 16 over the range of frequencies;

comparing the extracted resonant frequency and associated dynamic shape to a table of calibration shapes; and determining the external load.

The extracting step may include measuring acceleration of a plurality of locations on the loading plate and calculating the frequency and the dynamic shape of the load plate. The calculating step is done using fast fourier transform.

Generally speaking, the systems described herein are directed to force moment sensors. Various embodiments and aspects of the disclosure will be described with reference to details discussed below. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

As used herein, the terms, "comprises" and "comprising" are to be construed as being inclusive and open ended, and not exclusive. Specifically, when used in the specification and claims, the terms, "comprises" and "comprising" and variations thereof mean the specified features, steps or components are included. These terms are not to be interpreted to exclude the presence of other features, steps or components.

As used herein, the term "operably connected to" means that the elements are connected either directly or indirectly.

As used herein, the terms "about" and "approximately" are meant to cover variations that may exist in the upper and lower limits of the ranges of values, such as variations in properties, parameters, and dimensions. In one non-limiting example, the terms "about" and "approximately" mean plus or minus 10 percent or less.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

Unless defined otherwise, all technical and scientific terms used herein are intended to have the same meaning as commonly understood to one of ordinary skill in the art.

What is claimed is:

1. A computer implemented method of determining a force and moment measurement having six degrees of freedom for an external load applied to a force moment sensor having an inner tube, a load plate and a plurality of dynamics deflection measuring devices, the method comprising the steps of:

applying a current to the inner tube to excite the load plate through a plurality of definable frequencies;

extracting a plurality of resonant frequencies and associated dynamic shapes of the load plate from the plurality of definable frequencies and using the plurality of dynamics deflection measuring devices to measure deflection in six degrees of freedom;

comparing the plurality of extracted resonant frequencies and associated dynamic shapes to a plurality of calibration shapes, each corresponding to a defined force corresponding to the six degrees of freedom; and determining the external loads corresponding to the six degrees of freedom forces.

2. The computer implemented method of claim 1 wherein the extracting step includes measuring acceleration of a plurality of locations on the load plate and calculating the resonant frequency and the dynamic shape of the load plate.

3. The computer implemented method of claim 2 wherein the calculating step is done using fast Fourier transform.

4. The computer implemented method of claim 2 wherein measuring the acceleration of a plurality of locations is measured through a plurality of dynamic deflection measuring devices; the plurality of dynamic deflection measuring devices being spaced apart on the load plate.

5. The computer implemented method of claim 4 wherein each dynamic measuring device is an accelerometer.

6. The computer implemented method of claim 1 wherein the inner tube includes a plurality of poled segments, and each of the poled segments are independently responsive to current.

7. The computer implemented method of claim 6 wherein each of the poled segments is poled in an axis parallel to the centre axis of the inner tube.

8. The computer implemented method of claim 6 wherein each of the poled segments is poled in an axis angled to the centre axis of the inner tube.

9. The computer implemented method of claim 6 wherein at least one poled segment is poled in an axis parallel to the center axis and at least another poled segment is poled in an axis angled to the centre axis.

10. The computer implemented method of claim 6 wherein the inner tube includes at least four poled segments.

11. The computer implemented method of claim 6 wherein a current is serially applied to each of the plurality of poled segments to create a cyclic, swirling excitation.

12. The computer implemented method of claim 11 wherein the cyclic, swirling excitation of the plurality of poled segments is continuously repeated to excite torsion mode of the external load.

\* \* \* \* \*